United States Patent Office 2,862,953
Patented Dec. 2, 1958

2,862,953

DERIVATIVES OF 2-KETO-2,3,4,5,6,7,8,10-OCTAHYDRONAPHTHYL-(7)-METHANE AND A PROCESS FOR PREPARING THEM

Yasuo Abe, Ikeda, Osaka, Tadatsugu Harukawa, Sakyoku, Kyoto, Hisashi Ishikawa, Higashinada-ku, Kobe, Takuichi Miki, Amagasaki, Hyogo, Masao Sumi, Ikeda, Osaka, and Tadashi Toga, Ashiya, Hyogo, Japan, assignors to Takeda Pharmaceutical Industries, Ltd., Doshomachi, Higashi-ku, Osaka, Japan No Drawing. Application November 2, 1953
Serial No. 389,838

14 Claims. (Cl. 260—464)

This invention relates to the derivatives of 2-keto-2,3,4,5,6,7,8,10-octahydronaphthyl-(7)-methane and their homologues representable by the general Formula I,

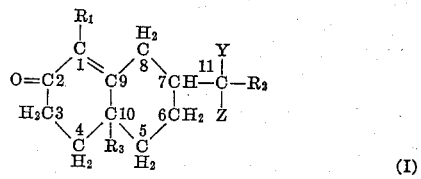

wherein $R_1$ represents hydrogen or alkyl such as methyl, ethyl, propyl, butyl, amyl, hexyl and higher alkyls, $R_2$ hydrogen or alkyl such as $R_1$ or aryl such as phenyl, tolyl and xylyl or aralkyl such as benzyl, phenethyl and menaphthyl, $R_3$ hydrogen or alkyl such as $R_1$, Y aliphatic or aromatic acyl such as acetyl, propionyl, butyryl, benzoyl, p-methoxybenzoyl and p-nitrobenzoyl, carboxyl or a radical convertible into carboxyl, such as ester, acid amide, N-substituted amide and nitrile, Z hydrogen or an atom or atomic group convertible into hydrogen, such as halogen nitro, acyl, carboxyl and a radical convertible into carboxyl, and to a process for preparing them.

The process comprises reaction of either 2-keto-2,3,4,5,6,10-hexahydronaphthalene or one of its derivatives representable by the general Formula II,

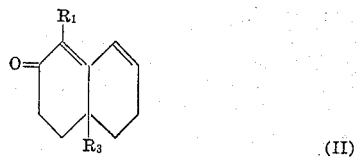

wherein $R_1$ represents hydrogen or alkyl, and $R_3$ hydrogen or alkyl (when both $R_1$ and $R_3$ are alkyl they may be the same or different), with one of the methane derivatives representable by the general Formula III,

wherein $R_2$ represents a member of the group consisting of hydrogen, alkyl, aryl and aralkyl, Y acyl, carboxyl or a group convertible into carboxyl, and Z hydrogen or an atom or atomic group convertible into hydrogen, or with one of their metal compounds (the combination of $R_2$, Y and Z must be such as retains the activity of the hydrogen marked with asterisk).

The object of this invention may be accomplished by the application of a condensation reaction like the so-called Michael's condensation. For example, when a compound representable by the general Formula II and either a compound representable by the general Formula III or one of its metal compounds are subjected to the condensation reaction, the latter condenses with the former at the double bond between $C_7$ and $C_8$ of the former, forming the product representable by the general Formula IV, because the resulting side-chain has a definite steric configuration relative to $R_3$, which prevents formation of the $C_{10}$-epimer representable by the general Formula V.

This reaction proceeds according to the following chart.

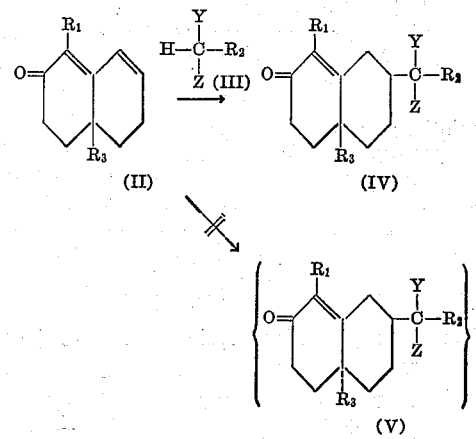

In general the reaction is conducted in an organic solvent such as alcohol, ether, benzene, toluene and pyridine in the presence of an organic base such as alkali alcoholate, piperidine and triton B, or an inorganic alkaline substance such as hydroxide and carbonate of alkali metal and alkaline earth metal, or metallic sodium, potassium and magnesium, or anion exchange resin, which serves to split the hydrogen marked with asterisk as proton. When conducted at room temperature, this reaction proceeds smoothly but takes a long time (scores of hours), whereas at 60–100° C. it is complete in several hours but with formation of considerable amount of resinous substance.

Condensation of a compound representable by the general Formula II with a metal compound of the compounds representable by the general Formula III requires no presence of such an organic or inorganic basic substance as mentioned above.

The reaction of this invention can be effected without much regard to the kinds of the substituents of the materials. For example, $R_1$ and $R_3$ may be hydrogen or methyl, ethyl or one of normal and ramified propyl, butyl, amyl, hexyl and higher alkyls, $R_2$ hydrogen, such alkyl as $R_1$ and $R_3$, or aryl such as phenyl, tolyl and xylyl, aralkyl such as benzyl, phenethyl and menaphthyl, Y aliphatic or aromatic acyl such as acetyl, propionyl, butyryl, benzoyl and p-nitrobenzoyl, carboxyl or a radical convertible into carboxyl, such as ester, nitrile, acid amide and N-substituted amide, and Z hydrogen or an atom or atomic group convertible into hydrogen, such as halogen, nitro, acyl, carboxyl and a group convertible into carboxyl.

We call provisionally this process the process for preparing the compounds of first group.

This invention also relates to a process for preparing derivatives of 2-keto-2,3,4,5,6,7,8,10-octahydronaphthyl-(7)-methane representable by the general Formula IV,

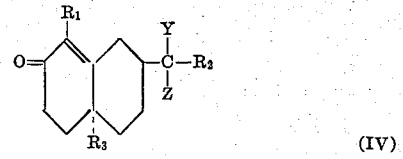

wherein $R_1$, $R_2$, $R_3$, Y and Z represent respectively the groups explained in the preceding process.

This process comprises reaction one of the derivatives of 3-keto-(4-alkyl)-cyclohexylmethane representable by the general Formula V

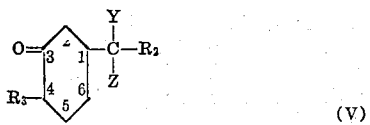

wherein $R_2$ represents hydrogen, alkyl, aryl or aralkyl, $R_3$ hydrogen or alkyl, Y acyl or a radical convertible into carboxyl, and Z hydrogen or an atom or atomic group convertible into hydrogen, and either one of the derivatives of vinyl ketone representable by the general formula VI $$R_1\text{—}CH_2\text{—}CO\text{—}CH\text{=}CH_2 \qquad (VI)$$

wherein $R_1$ represents hydrogen or alkyl, or one of their derivatives possible to provide with the above compound during the reaction, representable by the general Formula VII, $$R_1\text{—}CH_2\text{—}CO\text{—}CH_2\text{—}CH_2\text{—}W \qquad (VII)$$

wherein $R_1$ represents hydrogen or alkyl, and W halogen, quaternary ammonium nitrogen, or tertiary sulfonium sulphur.

The reaction proceeds according to the following chart.

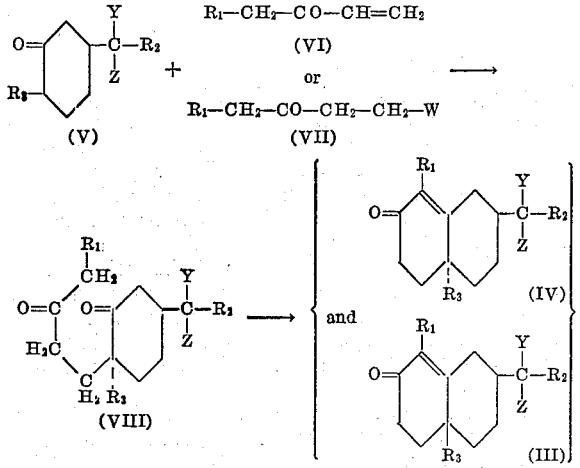

The object of this process can be accomplished by subjecting a compound representable by the general Formula V and either a compound representable by the general Formula VI or a compound representable by the general Formul VII to a condensation and ring closure reaction effected in the same mode as in the Robinson's reaction.

The steric configuration of $R_3$ in the product depends on that of $C_7$, and in this reaction the compound representable by the general Formula IV is main product and its opposite isomer representable by the general Formula III is by-product, the amount of which, however, is far smaller than that of the former. The two products can be separated from each other by recrystallization or by counter current distribution.

As shown in the above chart this reaction reaches the final step through an intermediate, 3-keto-(4-alkyl)-4-(3'-ketoalkyl)-cyclohexylmethane derivative representable by the general Formula VIII, but the reaction can be completed without separating the intermediate, or the intermediate may be isolated and then subjected to the ring closure reaction.

The first step to the intermediate is conducted in an anhydrous organic solvent such as alcohol, ether, benzene, pyridine, or in a mixture of them in the presence of an alkaline substance such as alkali amide, alkali alcoholate and alkali hydride. Isolation of the intermediate is possible only when the reaction is completed at low temperatures, especially with ice-cooling, within 2–3 hours. The intermediate is led to the final product by treating in water or in water-containing or anhydrous organic solvent, such as alcohol, ether, acetic acid and benzene, with an organic or inorganic alkaline substance such as alkali alcoholate, alkali hydride and alkali carbonate, or with an acid substance such as hydrochloric acid and sulfuric acid. This ring closure reaction can be completed at low temperature or at room temperature, but more readily by heating. When the reaction is led to the final step without isolating the intermediate, the ring closure reaction is effected in the presence of only the same reagent as is employed in the first step.

In the reaction of this process the kinds of substituents of the materials are not limited strictly. For example, in the general Formula V $R_2$ may be halogen or alkyl such as methyl, ethyl, normal and ramified propyl, butyl, amyl, hexyl and higher alkyls, or aryl such as phenyl, tolyl and xylyl, or aralkyl such as benzyl, phenethyl and menaphthyl, Y aliphatic and aromatic acyl such as acetyl, propionyl, butyryl, benzoyl and p-nitrobenzoyl, carboxyl or a radical convertible into carboxyl, such as ester, nitrile, acid amide and N-substituted amide, Z hydrogen or an atom or atomic group convertible into hydrogen, such as halogen, nitro, acyl such as acetyl, propionyl, butyryl, benzoyl and p-nitrobenzoyl, or a radical convertible into carboxyl, such as ester, nitrile, acid amide and N-substituted amide, and $R_3$ hydrogen or alkyl such as methyl, ethyl, normal and ramified propyl, butyl, amyl and higher alkyls. In the general Formulas VI and VII, $R_1$ may be hydrogen or alkyl such as methyl, ethyl, and normal and ramified propyl, butyl, amyl, hexyl and higher alkyls, and W halogen, quaternary ammonium nitrogen or tertiary sulfonium sulphur.

We call provisionally this process the process for preparing the compounds of second group.

The substituents at $C_{11}$ of all the derivatives of 2-keto-2,3,4,5,6,7,8,10-octahydronaphthyl-(7)-methane prepared by the two processes are all interchangeable. For example, when $R_2$ is hydrogen, and Z is acyl, carboxyl or a group convertible into carboxyl, the hydrogen is active, since it is attached to the carbon between two positive (electron attractive) groups, as in β-dicarboxylic acid, β-ketocarboxylic acid, their derivatives or in β-diketone, therefore, the hydrogen can be readily replaced by any alkyl by treating the compound with the corresponding alkyl halide, dialkyl sulfate or with alkyl p-toluene sulfonate along with alkali alcoholate or similar basic reagents. In the similar manner the hydrogen also can be replaced by aryl or by aralkyl. When Y and Z are a carboxy derivative such as ester, nitrile, amide or N-substituted amide, they are convertible into any other radical of these groups by such conversions as ester→amide, amide→nitrile, nitrile→amide, amide→ester, one ester→another ester, halogenide→amide, halogenide→ester, and all the groups are convertible into carboxyl by saponifying the compounds. On the contrary, when Y and Z are carboxyl, they are convertible into any of the above groups. When Z is acyl, it is convertible into hydrogen by the acid decomposition of the compound provided that Y is a group easily convertible into carboxyl, and when Z is carboxyl, it is also convertible into hydrogen by the decarboxylation of the compound, as in the case of β-dicarboxylic acid or β-ketocarboxylic acid. In short, all possible racemic modifications of the derivatives of 2-keto-2,3,4,5,6,7,8,10-octahydronaphthyl-(7)-methane are obtainable by the above two processes and conversions of $R_2$, Y and Z of the products.

These racemic compounds can be resolved into their optically active components by the conventional methods. For example, a racemic compound, wherein Y is carboxyl, is reacted with an optically active organic base such as brucine, strychnine, quinine, d- or l-ephedrin, d- or l-isopropylamine, or with one of their salts, and the resulting salt is resolved into its optically active components by taking advantage of their difference in solubility in a solvent, or by other methods. And finally the salts of the optically active components are decomposed, for example, with a mineral acid to liberate the free acid, respectively.

It goes without saying that if optically active materials are employed in the two processes, formation of the optically active products is possible.

Among the compounds covered by the present invention, those representable by the general Formula I wherein Y or Z is carboxyl are generally insoluble, in the cold, in water, petroleum ether and other mineral oils, and soluble in other common organic solvents or alkali carbonate, alkali bicarbonate and alkali hydroxide solution. The compounds of which neither Y nor Z is carboxyl are insoluble in water and soluble in organic solvents. Of the compounds covered by this invention, some are crystalline and some liquid at room temperature, and all the compounds give oxime, semicarbazone or hydrazone with the corresponding carbonyl reagent and show the ultraviolet absorption maximum peculiar to $\alpha,\beta$-unsaturated ketone. The compounds of which $R_1$ is hydrogen show absorption maximum at the vicinity of 240m$\mu$, which accords with the expected value for the structure of $\beta,\beta$-disubstituted $\alpha,\beta$-unsaturated ketone (the double bond is exocyclic), and the compounds of which $R_1$ is methyl or other alkyl or aralkyl show absorption maximum at the vicinity of 250m$\mu$, which endorses the compounds to be $\alpha,\beta,\beta$-trisubstituted $\alpha,\beta$-unsaturated ketone (the double bond is exocyclic).

From the course of the reactions and the fact that the analytical data of the compounds and their derivatives coincide well with the theoretical, it is evident that these compounds have the structure of the general Formula I. Furthermore, a series of the following reactions make certain the fact.

For example, saponification of methyl $\alpha$-[2-keto-1,10-dimethyl - 2,3,4,5,6,7,8,10 - octahydronaphthyl - (7)] - propionate prepared from methyl $\alpha$ - (3 - keto - 4 - methylcyclohexyl) - propionate and diethylamino - 3 - pentanone methiodide by the Robinson's reaction produces A - (M. P. 181° C.) and B - isomer (M. P. 125° C.) of $\alpha$ - [2 - keto - 1,10 - dimethyl - 2,3,4,5,6,7,8,10 - octahydronaphthyl - (7)] - propionic acid. When the products are dibrominated, the bromine introduced into $C_8$ forms a lactone ring, yielding the respective isomers of lactone of $\alpha$ - [2 - keto - 1,10 - dimethyl - 3 - bromo - 8 - hydroxy - 2,3,4,5, 6,7,8,10 - octahydronaphthyl - (7)] - propionic acid, which give A- and B-isomer of santonin by dehydrobromination with collidine. When the A-isomer is heated with 55% sulfuric acid at 50° to cause dienone-phenol rearrangement, it gives racemo - $\alpha$ - desmotroposantonin, and in similar manner the B - isomer racemo - $\beta$ - desmotroposantonin, both of which accord well with the respective authentic samples derived from natural santonin. Hence it is concluded that the above two compounds melting at 181° C. and 125° C., respectively, have the structure of the general Formula I wherein $R_1$, $R_2$ and $R_3$ are all methyl, Y is carboxyl, and Z hydrogen but epimeric at $C_{11}$ each other, and that the ester produced by the Robinson's reaction is a mixture of the isomers representable by the general Formula I wherein $R_1$, $R_2$ and $R_3$ are methyl, Y is carbomethoxy, and Z hydrogen.

On the other hand, when diethyl [2 - keto - 1,10 - dimethyl - 2,3,4,5,6,7,8,10 - octahydronaphthyl - (7)] - methylmalonate prepared by the condensation of 2 - keto - 1,10 - dimethyl - 2,3,4,5,6,10 - hexahydronaphthalene with diethyl methylmalonate according to the Michael reaction is saponified, then decarboxylated and finally crystallized fractionally, it gives C - (M. P. 145° C.) and D - isomer (M. P. 135° C.) of $\alpha$ - [2 - keto - 1,10 - dimethyl - 2,3,4,5,6,7,8,10 - octahydronaphthyl - (7)] - propionic acid. And when the two isomers are dibrominated separately and the products are treated with sodium bicarbonate solution, the bromine introduced into $C_8$ forms a lactone ring, yielding bromolactones, which affords C- and D - isomer of santonin by dehydrobromination with collidine, respectively. The C - isomer gives racemo - $\alpha$ - desmotroposantonin by its intramolecular rearrangement by the method mentioned above, and the D-isomer racemo - $\beta$ - desmotroposantonin, both of which accord well with the authentic samples derived from natural santonin, respectively. In this case, too, it is obvious that the isomers melting at 145° C. and 135° C, respectively, have the structure representable by the general Formula I wherein $R_1$, $R_2$ and $R_3$ are methyl, Y is carboxyl, and Z hydrogen but epimeric at $C_{11}$, accordingly the product of the Michael reaction is represented by the general Formula I wherein $R_1$, $R_2$ and $R_3$ are all methyl and both Y and Z are carbethoxy group.

The reaction proceeds according to the following chart.

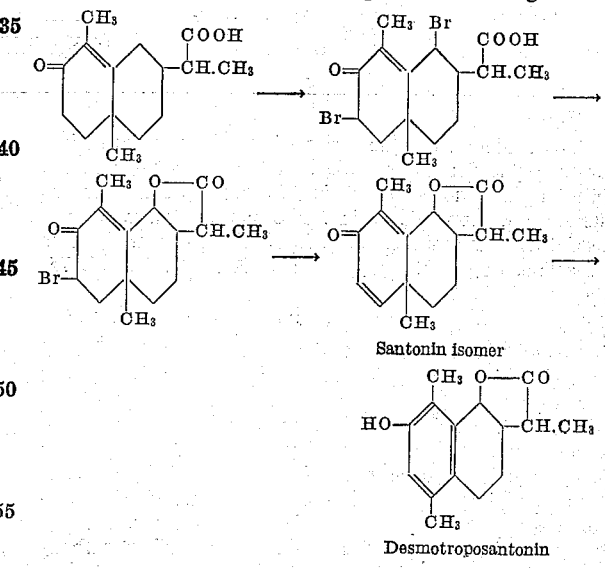

Santonin isomer

Desmotroposantonin

TABLE

[The compounds of which $C_{10}$ has the same configuration relative to $C_7$ with that of natural santonin are marked with +, and those having opposite configuration with −. As for the configuration of $C_{11}$ relative to $C_7$, the compounds having the same configuration with that of natural santonin ($\alpha$-santonin) are marked with $\alpha$, and those having opposite configuration with $\beta$.]

| Compound | | | | | Relative configuration to $C_7$ | | $[\alpha]_D$ | B. P. (° C.) | M. P. (° C.) | Cryst. form | Solvent for recryst. | 2,4-dinitrophenylhydrazone of the compounds | | |
|---|---|---|---|---|---|---|---|---|---|---|---|---|---|---|
| $R_1$ | $R_2$ | $R_3$ | Y | Z | $C_{10}$ | $C_{11}$ | | | | | | M.P. (°C.) | Cryst. form | Solvent for recryst. |
| $CH_3$ | H | $CH_3$ | $COOC_2H_5$ | $COCH_3$ | + | ---- | 0 | 168–173 (2 mm.) | | | | | | |
| $CH_3$ | H | $CH_3$ | $COOCH_3$ | $COCH_3$ | + | ---- | 0 | | | | | 208 | Red prism | |
| $CH_3$ | H | $CH_3$ | COOH | COOH | + | / | 0 | | 175 (decomp.) | | Ethyl acetate–P.E. | | | |
| $CH_3$ | H | $CH_3$ | $COOC_2H_5$ | $COOC_2H_5$ | + | / | 0 | | 71 | Prism | do | | | |
| $CH_3$ | H | $CH_3$ | $COOC_2H_5$ | COOH | + | | 0 | | 147 | | | | | |
| $CH_3$ | H | $CH_3$ | COOH | H | + | | 0 | | 135 | Prism | Ethylacetate. | | | |

Table.—Continued

[The compounds of which $C_{10}$ has the same configuration relative to $C_7$ with that of natural santonin are marked with +, and those having opposite configuration with −. As for the configuration of $C_{11}$ relative to $C_7$, the compounds having the same configuration with that of natural santonin ($\alpha$-santonin) are marked with $\alpha$, and those having opposite configuration with $\beta$.]

| Compound | | | | | Relative configuration to $C_7$ | | $[\alpha]_D$ | B. P. (°C.) | M. P. (°C.) | Cryst. form | Solvent for recryst. | 2,4-dinitrophenylhydrazone of the compounds | | |
|---|---|---|---|---|---|---|---|---|---|---|---|---|---|---|
| $R_1$ | $R_2$ | $R_3$ | Y | Z | $C_{10}$ | $C_{11}$ | | | | | | M.P. (°C.) | Cryst. form | Solvent for recryst. |
| $CH_3$ | H | $CH_3$ | $COOC_2H_5$ | H | + | ---- | 0 | | | | | 150 | Red needle | Benzene-methanol. |
| $CH_3$ | $CH_3$ | $CH_3$ | COOH | H | + | $\alpha$ | 0 | | 146 | Prism | | | | |
| $CH_3$ | $CH_3$ | $CH_3$ | COOH | H | + | $\beta$ | 0 | | 135 | do | | | | |
| $CH_3$ | $CH_3$ | $CH_3$ | $COOCH_3$ | H | + | $\alpha$ | 0 | | | | | 145 | | Do. |
| $CH_3$ | $CH_3$ | $CH_3$ | $COOCH_3$ | H | + | $\beta$ | 0 | | | | | 173 | | Do. |
| $CH_3$ | $CH_3$ | $CH_3$ | $CONH_2$ | H | + | $\beta$ | 0 | | 189 | Prism | | | | |
| $CH_3$ | $CH_3$ | $CH_3$ | CN | H | + | ---- | 0 | | | | | 201 | Red needle | Benzene. |
| $CH_3$ | $CH_3$ | $CH_3$ | COOH | COOH | + | / | 0 | | 190 | Prism | | | | |
| $CH_3$ | $CH_3$ | $CH_3$ | $COOCH_3$ | $COOCH_3$ | + | / | 0 | | 72 | do | Ethyl acetate—P.E. | | | |
| $CH_3$ | $CH_3$ | $CH_3$ | $COOC_2H_5$ | $COOC_2H_5$ | + | / | 0 | 185–190 (3 mm.) | 61 | | | 123 | | Alcohol. |
| $CH_3$ | $CH_3$ | $CH_3$ | $COOCH_3$ | COOH | + | ---- | 0 | | 132 | | | | | |
| $CH_3$ | $CH_3$ | $CH_3$ | CN | COOH | + | ---- | 0 | | 215 (decomp.) | Prism | Ethyl acetate-methanol. | | | |
| $CH_3$ | $CH_3$ | $CH_3$ | CN | $COOCH_3$ | + | ---- | 0 | | | | | 110 | Red prism | Benzene—P.E. |
| $CH_3$ | $CH_3$ | $CH_3$ | $COOC_2H_5$ | $COCH_3$ | + | ---- | 0 | 179–184 (8 mm.) | | | | 209 | Red plate | Ethyl acetate. |
| H | $CH_3$ | $CH_3$ | COOH | H | − | ---- | 0 | | 163 | Prism | Ethyl acetate. | | | |
| H | $CH_3$ | $CH_3$ | $COOCH_3$ | H | − | ---- | 0 | 160–170 (3 mm.) | | | | | | |
| $CH_3$ | $CH_3$ | $CH_3$ | COOH | H | − | $\alpha$ | 0 | | 181 | | Ethyl acetate. | | | |
| $CH_3$ | $CH_3$ | $CH_3$ | COOH | H | − | $\alpha$ | +91.0 | | 121–122 | | Dil. methanol. | | | |
| $CH_3$ | $CH_3$ | $CH_3$ | COOH | H | − | $\alpha$ | −91.0 | | 121–122 | | do | | | |
| $CH_3$ | $CH_3$ | $CH_3$ | COOH | H | − | $\beta$ | 0 | | 86 (1·$H_2O$), 125 (anhydrous). | | Ether | | | |
| $CH_3$ | $CH_3$ | $CH_3$ | $COOCH_3$ | H | − | $\alpha$ | 0 | | 92 | | | 195 | | Methanol. |
| $CH_3$ | $CH_3$ | $CH_3$ | $COOCH_3$ | H | − | $\beta$ | 0 | | | | | 200 | | |
| $CH_3$ | $CH_3$ | $CH_3$ | $COOC_2H_5$ | $COOC_2H_5$ | − | / | 0 | 170–185 (1 mm.) | | | | | | |

P. E. designates petroleum ether.

It is evident from the series of reactions set forth just prior to the foregoing table that the compounds at the present invention are useful for the preparation of santonin compounds which, like natural santonin, are useful as anthelmintics, e. g. in eliminating roundworms of swine, dogs, cats, etc.; see also J. A. C. S., vol. 75, page 2567 (1953).

Example 1

Sixty-five grams of diethyl malonate was added to a solution of sodium ethylate prepared from 200 cc. of alcohol and 2 g. of sodium, and 15 g. of 2-keto-1,10-dimethyl-2,3,4,5,6,10-hexahydronaphthalene was dropped therein with stirring. After standing for 40 hours at room temperature with occasional stirring, 6 cc. of glacial acetic acid was added to the mixture, and the alcohol was distilled off. The residue was dissolved in ether, and the ethereal solution was washed with water, sodium carbonate solution and with water successively and, after drying, was distilled under reduced pressure, whereupon 7.8 g. of diethyl 2-keto-1,10-dimethyl-2,3,4,5,6,7,8,10-octahydronaphthyl-(7)-malonate distilled over between 195 and 200° C. (2 mm.), and solidified on standing. The product was recrystallized from a mixture of petroleum ether and ethyl acetate in colorless prisms, M. P. 71° C., $\lambda$ max. 247 m$\mu$ [1].

Example 2

One hundred grams of diethyl methylmalonate was reacted with 25 g. of 2-keto-1,10-dimethyl-2,3,4,5,6,10-hexahydronaphthalene, and the reaction mixture was treated as in Example 1, whereupon 21 g. of diethyl 2-keto-1,10-dimethyl-2,3,4,5,6,7,8,10-octahydronaphthyl-(7)-methylmalonate, B. P. 185–190° C. (3 mm.) was obtained, which solidified on cooling and melted at 61° C. after recrystallization from petroleum ether. The product gave a 2,4-dinitrophenylhydrazone, M. P. 123° C.

Example 3

Three hundred and fifty-five grams of methyl $\alpha$-methylcyanoacetate was reacted with 40 g. of 2-keto-1,10-dimethyl-2,3,4,5,6,10-hexahydronaphthalene, and the reaction mixture was treated as in Example 1, whereupon 23 g. of methyl $\alpha$-cyano-$\alpha$-(2-keto-1,10-dimethyl-2,3,4,5,6,7,8,10-octahydronaphthyl-7)-propionate, B. P. 190° C. (2 mm.), which solidified partially on standing, was obtained. The product was recrystallized from a mixture of benzene and petroleum ether or from methanol in colorless prisms, M. P. 110° C.

Example 4

Eighty grams of methyl acetoacetate was reacted with 10 g. of 2-keto-1,10-dimethyl-2,3,4,5,6,10-hexahydronaphthalene, and the reaction mixture was treated as described in Example 1, whereupon 7 g. of methyl 2-keto-1,10-dimethyl-2,3,4,5,6,7,8,10-octahydronaphthyl-(7)-acetoacetate, B. P. 168–173° C. (2 mm.) was obtained. The product gave a 2,4-dinitrophenylhydrazone with M. P. 208° C.

Example 5

A mixture of 17.6 g. of 2-keto-1,10-dimethyl-2,3,4,5,6,10-hexahydronaphthalene, 144 g. of ethyl $\alpha$-methylacetoacetate and sodium ethylate prepared from 3.0 g. of sodium and 30 cc. of ethylalcohol was kept standing at room temperature for 40 hours and worked up as described above. Eleven and three tenths grams of ethyl $\alpha$-(2-keto-1,10-dimethyl-2,3,4,5,6,7,8,10-octahydronaphthyl-7)-$\alpha$-acetropropionate was obtained, B. P. 179–184° C. (8 mm.). The 2,4-dinitrophenylhydrazone was recrystallized from ethyl acetate in red plates, M. P. 209° C.

---

[1] All absorption spectra were measured in alcohol with a Beckman spectrophotometer.

Example 6

To a mixture of 100 g. of diethyl methylmalonate and a solution of sodium ethylate prepared from 1 g. of sodium and 100 cc. of absolute alcohol was added dropwise 15 g. of 2-keto-1,10-dimethyl-2,3,4,5,6,10-hexahydronaphthalene, and the whole was boiled on a water bath for 3 hours. After cooling, the reaction mixture was neutralized with acetic acid, poured into large quantities of water and extracted with ether. The extract was washed with water, sodium carbonate solution and water successively and, after drying and evaporating, subjected to fractional distillation under reduced pressure, whereupon 4 g. of diethyl 2-keto-1,10-dimethyl-2,3,4,5,6,7,8,10-octahydronaphthyl-(7)-methylmalonate distilling at 195° C. (4 mm.) was obtained.

Example 7

Five grams of dimethyl 2-keto-1,10-dimethyl-2,3,4,5,6,7,8,10-octahydronaphthyl-(7)-methylmalonate, obtained in Example 2, was added to a solution of 3.5 g. of potassium hydroxide in 3 cc. of water and 35 cc. of methanol with ice-cooling. The reaction mixture was allowed to stand at 20° C. overnight and poured into a large amount of water and shaken with ether to remove unsaponified material. The aqueous solution was acidified and extracted with ether. The extract was washed with water, dried, and evaporated to give 2.5 g. of ethyl hydrogen α-[2-keto-1,10-dimethyl-2,3,4,5,6,7,8,10-octahydronaphthyl-(1)]-malonate, M. P. 152° C.

Example 8

To a solution of 3 g. of diethyl 2-keto-1,10-dimethyl-2,3,4,5,6,7,8,10-octahydronaphthyl-(7)-malonate, prepared as Example 1, in 30 cc. of dioxane was added 15 cc. of 1 N-hydrochloric acid and the mixture heated on a water-bath for 3 hours. The solvent was distilled from the reaction mixture in vacuo, and the residue was stirred with ether, and the ethereal layer was extracted with sodium carbonate solution. The extract was acidified with hydrochloric acid, extracted with ether, and on evaporation there was obtained 0.2 g. of ethyl hydrogen 2-keto-1,10-dimethyl-2,3,4,5,6,7,8,10-octahydronaphthyl-(7)-malonate, M. P. 143–149° C.

Example 9

Two grams of ethyl hydrogen 2-keto-1,10-dimethyl-2,3,4,5,6,7,8,10-octahydronaphthyl-(7)-malonate, obtained in Example 8, was melted under reduced pressure in a metal bath, and after evolution of carbon dioxide had subsided the temperature of the metal bath was raised to distill the resulting ethyl 2-keto-1,10-dimethyl-2,3,4,5,6,7,8,10-octahydronaphthyl-(7)-acetate. The yield was 1.2 g. The 2,4-dinitrophenylhydrazone of the product was recrystallized from a mixture of benzene and methanol in red needles, M. P. 152° C.

Example 10

To a solution of 7.5 g. of diethyl 2-keto-1,10-dimethyl-2,3,4,5,6,7,8,10-octahydronaphthyl-(7)-malonate, obtained in Example 1, was added gradually a solution of 4 g. of potassium hydroxide in 7 cc. of water and, after standing at room temperature overnight, the mixture was boiled for one hour. The reaction mixture was neutralized with acetic acid and added with ether and water. The ether layer was separated and extracted with sodium carbonate solution, and the extract was acidified with hydrochloric acid to precipitate 4.5 g. of 2-keto-1,10-dimethyl-2,3,4,5,6,7,8,10-octahydronaphthyl-(7)-malonic acid, M. P. 173–175° C. (decomp.).

Example 11

A mixture of 0.5 g. of ethyl hydrogen 2-keto-1,10-dimethyl-2,3,4,5,6,7,8,10-octahydronaphthyl-(7)-malonate, obtained in Example 8, 10 cc. of methanol, 0.5 g. of potassium hydroxide and 1 cc. of water was boiled for one hour and treated as in Example 10, whereupon 0.3 g. of 2-keto-1,10-dimethyl-2,3,4,5,6,7,8,10-octahydronaphthyl-(7)-malonic acid, M. P. 173–175° C. (decomp.) was obtained.

Example 12

One gram of 2-keto-1,10-dimethyl-2,3,4,5,6,7,8,10-octahydronaphthyl-(7)-malonic acid, obtained in Example 10 or 11, was treated as in Example 9, and the product was recrystallized from ethyl acetate to give 0.7 g. of 2-keto-1,10-dimethyl-2,3,4,5,6,7,8,10-octahydronaphthyl-(7)-acetic acid, M. P. 135° C.

Example 13

Seventy-five grams of diethyl 2-keto-1,10-dimethyl-2,3,4,5,6,7,8,10-octahydronaphthyl-(7)-methylmalonate, obtained in Example 2, was treated as in Example 10, and the product was recrystallized from ethyl acetate or from dilute methanol to give 60 g. of 2-keto-1,10-dimethyl-2,3,4,5,6,7,8,10-octahydronaphthyl-(7)-methylmalonic acid, M. P. 204° C.

Example 14

One and nine tenths grams of ethyl hydrogen 2-keto-1,10-dimethyl-2,3,4,5,6,7,8,10-octahydronaphthyl-(7)-methylmalonate, prepared as in Example 7, was dissolved in 20 cc. of pyridine and boiled for 30 minutes to decarboxylate. The reaction mixture was poured into dilute sulfuric acid and extracted with ether. The extract was washed, dried, evaporated and distilled in vacuo to yield 1.4 g. of ethyl α-(2-keto-1,10,-dimethyl-2,3,4,5,6,7,8,10-octahydronaphthyl-7)-propionate, B. P. 160–170° C. (3 mm.).

Example 15

Four grams of ethyl hydrogen 2-keto-1,10-dimethyl-2,3,4,5,6,7,8,10-octahydronaphthyl-(7)-methylmalonate prepared by the process given in Example 7, was treated as in Example 11, whereupon 3.6 g. of 2-keto-1,10-dimethyl-2,3,4,5,6,7,8,10-octahydronaphthyl-(7)-methylmalonic acid, M. P. 204° C., was obtained.

Example 16

Seven grams of 2-keto-1,10-dimethyl-2,3,4,5,6,7,8,10-octahydronaphthyl-(7)-methylmalonic acid, obtained in Example 13 or 15, was heated at 190–200° C. under reduced pressure, or at 140° C. with pyridine or quinoline for 30 minutes to decarboxylate. The product (after distilling off of the base under reduced pressure in the second process) was extracted with ether, and from the extract was obtained 5 g. of an isomeric mixture of α-2-keto-1,10-dimethyl-2,3,4,5,6,7,8,10-octahydronaphthyl-(7)-propionic acid. The crude product was purified by fractional recrystallization first from a mixture of ethyl acetate and petroleum ether, then from dilute methanol. The pure D-acid, thus obtained, melts at 135° C. The product obtained from the mother liquors (the mixture of ethyl acetate and petroleum ether) was recrystallized repeatedly from dilute methanol, whereupon 0.1 g. of another isomer (C-acid M. P. 146° C.) was obtained.

Example 17

Fifteen grams of 2-keto-1,10-dimethyl-2,3,4,5,6,7,8,10,-octahydronaphthyl-(7)-methylmalonic acid, obtained in Example 13 or 15, was added to a mixture of 200 cc. of methanol and 8 g. of sulfuric acid and heated on a water-bath for two hours. The reaction mixture was concentrated under reduced pressure and extracted with ether, and the extract was washed with water, sodium carbonate solution and water successively. After distilling off the ether the residue was subjected to fractional distillation, whereupon dimethyl 2-keto-1,10-dimethyl-2,3,4,5,6,8,10-octahydronaphthyl-(7)-methylmalonate distilled over at 195–205° C. (2 mm.) and solidified on standing. The crude product was recrystallized from a mixture of benzene and petroleum ether in prisms, M. P. 72° C. The yield was 12 g.

Example 18

To a solution of 2.1 g. of methyl α-cyano-α-(2-keto-1,10-dimethyl-2,3,4,5,6,7,8,10-octahydronaphthyl-7)-propionate, prepared as in Example 3, in 10 cc. of methanol was added 10 cc. of 4% potassium hydroxide solution and the mixture heated at 50° C. for an hour. The reaction mixture was shaken with ether to remove unsaponified material and acidified with hydrochloric acid to precipitate the resulting α-cyano-α-(2-keto-1,10-dimethyl-2,3,4,5,6,7,8,10-octahydronaphthyl-7)-propionic acid, melting at 205° C. (decomp.) after recrystallization from a mixture of methanol and ethyl acetate. The yield 1.5 g.

Example 19

A solution of 2 g. of α-cyano-α-(2-keto-1,10-dimethyl-2,3,4,5,6,7,8,10-octahydronaphthyl-7)-propionic acid, obtained in Example 18, in 5 cc. of collidine was boiled for 15 minutes and then ether was added. The ethereal solution was washed with dilute sulfuric acid, sodium carbonate solution and water successively and evaporated to leave 1 g. of α-(2-keto-1,10-dimethyl-2,3,4,5,6,7,8,10-octahydronaphthyl-7)-propionitrile. The product gave a 2,4-dinitrophenylhydrazone in red needles, M. P. 202° C.

Example 20

A mixture of 0.5 g. of α-(2-keto-1,10-dimethyl-2,3,4,5,6,7,8,10-octahydronaphthyl-7)-propionitrile, obtained in Example 19, and 3 cc. of concentrated sulfuric acid was heated on a water-bath for 30 minutes and then poured into water. The resulting oily substance was extracted with ether, and the extract was washed with sodium carbonate solution and water and evaporated, whereupon 0.2 g. of α-(2-keto-1,10-dimethyl-2,3,4,5,6,7,8,10-octahydronaphthyl-7)-propionamide was obtained in colorless needles, M. P. 189° C.

Example 21

A mixture of 0.5 g. of α-(2-keto-1,10-dimethyl-2,3,4,5,6,7,8,10-octahydronaphthyl-7)-propionitrile, obtained in Example 20, 10 cc. of dioxane and 5 cc. of 10% sodium hydroxide solution was boiled for 3 hours and concentrated under reduced pressure. The concentrated solution was shaken with ether to remove unsaponified material and acidified with hydrochloric acid. The aqueous solution was extracted with ether, and the extract was washed with water and evaporated, whereupon 0.1 g. of α-(2-keto-1,10-dimethyl-2,3,4,5,6,7,8,10-octahydronaphthyl-7)-propionic acid, M. P. 140° C., was obtained.

Example 22

A mixture of 79.2 g. of methyl α-(3-keto-4-methylcyclohexyl)-propionate, 18 g. of powdered sodamide and 600 cc. of ether was refluxed for 4 hours. Then a solution of 119.6 g. of 1-diethylaminopentanone-3 methiodide in 100 cc. of dry pyridine was added dropwise over a period of 3 hours below 0° C., the mixture was kept at room temperature overnight and the reaction was completed by refluxing for 3 hours. Water was then added and the oil taken up in ether. The extract was dried over anhydrous sodium sulfate and evaporated. On distillation of the residue, unreacted methyl α-(3-keto-4-methylcyclohexyl)-propionate was first recovered and 10 g. of methyl α-(2-keto-1,10-dimethyl-2,3,4,5,6,7,8,10-octahydronaphthyl-7)-propionate was obtained as yellow oil, B. P. 170–185° C. (3 mm.). The redistilled oil showed an absorption maximum at 250 mμ (log ε 4.05). The 2,4-dinitrophenylhydrazone was recrystallized from ethyl acetate as red needles, M. P. 185° C., λ max. 258 mμ (log ε 4.25) and 388 mμ (log ε 4.45).

Example 23

To a methiodide prepared from 160 g. of 1-diethylaminopentan-3-one and 150 g. of methyl iodide a solution of 205 g. of methyl α-(3-keto-4-methylcyclohexyl)-propionate in 500 cc. of dry benzene and then 24 g. of sodium dissolved in 500 cc. of anhydrous methanol were added dropwise with stirring and cooling at 0° C. After standing overnight at room temperature, the mixture was refluxed for 1.5 hours with stirring. After cooling, the solution was diluted with ether, 60 g. of glacial acetic acid added and the organic solvent was removed under reduced pressure. The resulting oily product was extracted with ether, and the extract was washed with water, sodium carbonate solution, again with water, and dried over anhydrous sodium sulfate. The ether was evaporated, and distillation of the residue gave 105 g. of methyl α-(2-keto-1,10-dimethyl-2,3,4,5,6,7,8,10-octahydronaphthyl-7)-propionate, together with 50 g. of recovered methyl α-(3-keto-4-methylcyclohexyl)-propionate.

Example 24

To a solution of 36 g. of methyl α-(3-keto-4-methylcyclohexyl)-propionate and 15 g. of ethylvinylketone in 60 cc. of tertiary butanol was added dropwise a solution of potassium butylate prepared from 2 g. of potassium and tertiary butanol with ice-cooling and stirring. The mixture was allowed to stand at room temperature overnight, boiled for 2 hours and water was added, and the separated oil was extracted with ether. The extract was dried over anhydrous sodium sulfate and, after distilling off the solvent, subjected to fractional distillation. The forerunner (26 g.) distilling below 180° C. (4 mm.) was put aside, and 8 g. of methyl α-(2-keto-1,10-dimethyl-2,3,4,5,6,7,8,10-octahydronaphthyl-7)-propionate, B. P..4 180–200° C. was collected. The product gave a 2,4-dinitrophenylhydrazone, M. P. 195° C., undepressed on admixture with the derivative prepared in Example 22.

Example 25

To a suspension of 8 g. of sodium amide in 300 cc. of dry ether was added dropwise a solution of 39.6 g. of methyl α-(3-keto-4-methylcyclohexyl)-propionate in 100 cc. of dry ether, and the whole was boiled for 4 hours. To the reaction mixture was added dropwise a solution of 24 g. of 1-chloropentanon-(3) in 100 cc. of dry ether at 20° C. with stirring and, after standing overnight, there was further added dropwise a solution of sodium methylate prepared from 4.6 g. of metallic sodium and 100 cc. of anhydrous methanol at a temperature below 10° C. and allowed to stand overnight. Then, the mixture was boiled for 2 hours and, after cooling, neutralized with acetic acid, diluted with large quantities of water and extracted with ether. The ethereal solution was washed with sodium bicarbonate solution and water successively, dried and distilled in vacuo to give 2.5 g. of methyl α-(2-keto-1,10-dimethyl-2,3,4,5,6,7,8,10-octahydronaphthyl-7)-propionate, B. P. 180–190° C. (5 mm.).

Example 26

The quaternary ammonium salt prepared from 47 g. of diethylaminobutanone-(3) and 49 g. of methyl iodide was reacted with 17 g. of methyl α-(3-keto-4-methylcyclohexyl)-propionate and treated as in Example 23 to yield 16 g. of methyl α-(2-keto-10-methyl-2,3,4,5,6,7,8,10-octahydronaphthyl-7)-propionate, B. P. 160–170° C. (3 mm.).

Example 27

The quaternary ammonium salt prepared from 15.7 g. of 1-diethylaminopentanone-(3) and 14.2 g. of methyl iodide was reacted with 27 g. of diethyl (3-keto-4-methylcyclohexyl)-methylmalonate and sodium alcoholate prepared from 3.7 g. of sodium as in Example 23, and the reaction mixture was worked up as described above to give 6.3 g. of diethyl 2-keto-1,10-dimethyl-2,3,4,5,6,7,8,10-octahydronaphthyl-(7)-methylmalonate, B. P. 170–185° C. (1 mm).

Example 28

One hundred and sixty-five grams of methyl α-(2-keto-1,10-dimethyl-2,3,4,5,6,7,8,10-octahydronaphthyl-7)- propionate, obtained in Example 22, was boiled under reflux for 3 hours with 180 g. of potassium hydroxide and 1500 cc. of methanol. After cooling, the mixture was acidified with glacial acetic acid and the solvent was removed under reduced pressure. The residue was diluted with water, the separating oil was taken up in ether and the ether layer extracted with sodium carbonate solution. The alkaline solution was then acidified with hydrochloric acid, extracted with ether, and the extract was washed with water, dried over anhydrous sodium sulfate and evaporated. On cooling the residue, 33 g. of crystalline material separated. Recrystallization from ethyl acetate gave α-(2-keto-1,10-dimethyl-2,3,4,5,6,7,8,10-octahydronaphthyl-7)-propionic acid (A-isomer) as colorless prisms, M. P. 181° C., λ max. 250 mµ (log ε 4.11).

From the mother liquors of A-acid, 24.6 g. of a second crystalline product was obtained and this B-acid was recrystallized from petroleum ether as colorless prisms, M. P. 125° C., λ max. 250 mµ (log ε 4.16).

After A- and B-acid were removed by exhaustive crystallization, the remaining oily substance was purified by reesterification with diazomethane and subsequent fractional distillation and chromatographic separation on alumina.

Hydrolysis of the resulting ester gave a mixture of C- and D-acid as crystals, M. P. ca. 110° C.

*Example 29*

Fourteen grams of methyl α-(2-keto-10-methyl-2,3,4,5,6,7,8,10-octahydronaphthyl-7)-propionate, obtained according to Example 26, was saponified by heating for 4 hours with 16 g. of potassium hydroxide and 160 cc. of methanol and worked up as usual to afford 2.3 g. of α-(2-keto-10-methyl-2,3,4,5,6,7,8,10-octahydronaphthyl-7)-propionic acid, M. P. 161.5–163° C.

*Example 30*

To a suspension of 10 g. of α-(2-keto-1,10-dimethyl-2,3,4,5,6,7,8,10-octahydronaphthyl-7)-propionic acid-A, M. P. 181° C., prepared in Example 28 in 200 cc. of ether was added dropwise a solution of diazomethane prepared from 20 g. of nitrosomethylurea with cooling and stirring, and allowed to stand overnight. The reaction mixture was washed with sodium carbonate solution and water successively, dried and concentrated, whereupon 10 g. of methyl α-(2-keto-1,10-dimethyl-2,3,4,5,6,7,8,10-octahydronaphthyl-7)-propionate-A was obtained. Recrystallization from petroleum ether of the product yielded colorless prisms, M. P. 91–92° C. The 2,4-dinitrophenylhydrazone of the product melts at 195° C. after recrystallization from ethyl acetate.

*Example 31*

Thirty-three grams of α-(2-keto-1,10-dimethyl-2,3,4,5,6,7,8,10-octahydronaphthyl-7)-propionic acid-B, M. P. 125° C., prepared in Example 28, was methylated as in Example 30 to give 34 g. of methyl α-(2-keto-1,10-dimethyl - 2,3,4,5,6,7,8,10 - octahydronaphthyl - 7) - propionate-B, B. P. 165–173° C. (1 mm.). The 2,4-dinitrophenylhydrazone of the product melts at 200° C.

*Example 32*

Twelve grams of α-(2-keto-1,10-dimethyl-2,3,4,5,6,7,8, 10-octahydronaphthyl-7)-propionic acid-A, M. P. 181° C., was dissolved in a warm solution of 22 g. of brucine in 30 cc. of alcohol and allowed to stand at room temperature for several hours. The separated crystals were filtered and washed several times with cold methanol to yield 15 g. of the brucine salt. The washings were combined with the mother liquors and concentrated to give 0.6 g. of the additional crop. The combined products were recrystallized from methanol into colorless needles, M. P. 125° C.

Fifteen grams of the brucine salt was decomposed with 5% sodium hydroxide solution, the liberated brucine was removed by shaking with chloroform, and the alkaline solution was acidified with hydrochloric acid to separate 5.5 g. of the dextrorotatory acid. Recrystallization from dilute methanol of the product gave colorless prisms of dextrorotatory α-(2-keto-1,10-dimethyl-2,3,4,5, 6,7,8,10-octahydronaphthyl-7)-propionic acid-A, M. P. 121–122° C., [α]$_D^{16}$+91.0° (in alcohol).

When the mother liquors of the brucine salt was evaporated to dryness, and the residue was treated with sodium hydroxide solution, the crude laevorotatory acid was obtained. Five and one-tenth grams of the crude acid and 3.3 g. of d-ephedrine were dissolved in 25 cc. of warm ethyl acetate, and the solution was left standing to separate 8.2 g. of the ephedrine salt. Repeated recrystallizations of the product from ethyl acetate gave 4.5 g. of colorless needles, M. P. 123° C. The pure salt was decomposed and treated as in the case of the brucine salt, and the resulting acid (2.8 g.) was recrystallized from dilute methanol to yield colorless prisms of laevorotatory α-(2-keto-1,10-dimethyl-2,3,4,5,6,7,8,10-octahydronaphthyl-7)-propionic acid-A, M. P. 121–122° C., [α]$_D^{15}$—90.0° (in alcohol).

What is claimed is:

1. A process for preparing a compound corresponding to the formula

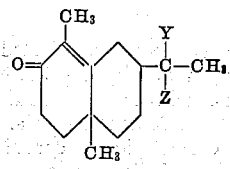

wherein Y represents a member selected from the group consisting of hydrogen and the COOH, lower carbalkoxy, CONH$_2$, carboxylic acid acyl and nitrile groups, and Z represents a member selected from the group consisting of hydrogen and COOH, lower carbalkoxy, nitro, carboxylic acid acyl and nitrile groups, which comprises reacting the compound of the formula

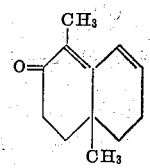

with a compound corresponding to the formula

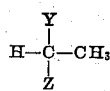

wherein Y and Z have the precedingly-recited significances, in an inert organic solvent in the presence of a member selected from the group consisting of organic bases, inorganic bases, base-forming metals and anion exchange resin.

2. A process for preparing a compound corresponding to the formula

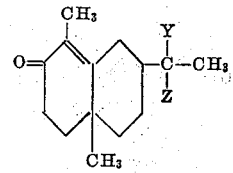

wherein Y represents a member selected from the group consisting of hydrogen and the COOH, lower carbalkoxy, CONH$_2$, carboxylic acid acyl and nitrile groups, and Z represents a member selected from the group consisting of hydrogen and COOH, lower carbalkoxy, nitro, carboxylic acid acyl and nitrile groups, which comprises reacting the compound of the formula

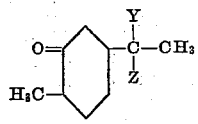

wherein Y and Z have the precedingly-recited significances, with a compound selected from the group consisting of compounds corresponding to the formulae

and

and the halides and quaternary ammonium compounds of the latter, in an inert organic solvent in the presence of a member selected from the group consisting of organic bases, inorganic bases, base-forming metals and anion exchange resin.

3. A compound corresponding to the formula

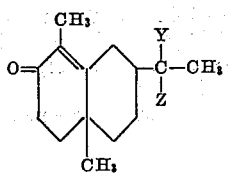

wherein Y represents a member selected from the group consisting of hydrogen, and the COOH, lower carbalkoxy, $CONH_2$, carboxylic acid acyl and nitrile groups, and Z represents a member selected from the group consisting of hydrogen and COOH, lower carbalkoxy, nitro, carboxylic acid acyl and nitrile groups.

4. A compound having the general formula

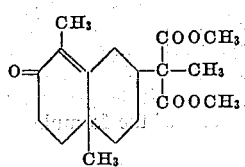

5. A compound having the general formula

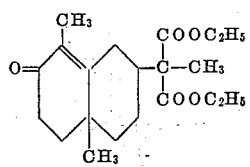

6. A compound having the general formula

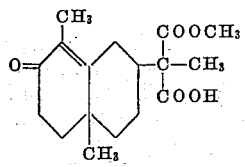

7. A compound having the general formula

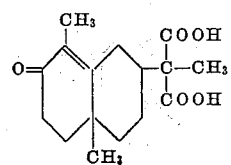

8. A compound having the general formula

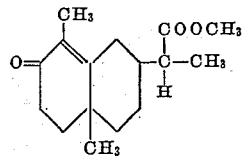

9. A compound having the general formula

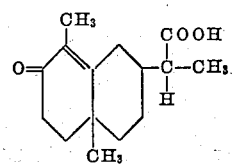

10. A compound having the general formula

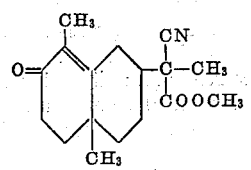

11. A compound having the general formula

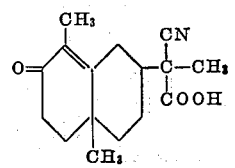

12. A compound having the general formula

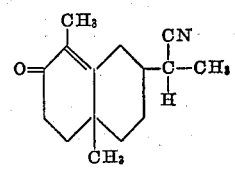

13. A compound having the general formula

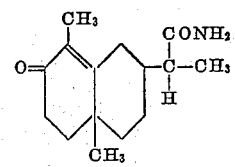

14. A compound having the general formula

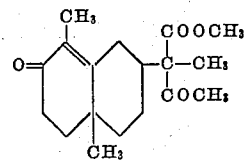

References Cited in the file of this patent

UNITED STATES PATENTS 2,673,872    Newman et al.    Mar. 30, 1954
2,678,931    Hogg et al.    May 18, 1954

OTHER REFERENCES

Hickinbottom: "Reactions of Organic Compounds," pp. 35 to 37 (1948).

Abe et al.: Proc. Japan. Acad., 28, 425 to 428 (1952), cited in Chem. Abst. 48, 1317 (1954).

McQuillin: Chem. Abst., 49, 3916 (1955); citing Chem and Ind., 311-2 (1952).